(12) United States Patent
Olennikov

(10) Patent No.: US 8,678,741 B2
(45) Date of Patent: Mar. 25, 2014

(54) OIL COOLED RUNNER

(75) Inventor: Alexander Yurievich Olennikov, St. Petersburg (RU)

(73) Assignee: Pratt & Whitney Canada Corp., Longueuil (CA)

( * ) Notice: Subject to any disclaimer, the term of this patent is extended or adjusted under 35 U.S.C. 154(b) by 392 days.

(21) Appl. No.: 13/121,450

(22) PCT Filed: Nov. 28, 2008

(86) PCT No.: PCT/RU2008/000730
§ 371 (c)(1),
(2), (4) Date: Mar. 29, 2011

(87) PCT Pub. No.: WO2010/062209
PCT Pub. Date: Jun. 3, 2010

(65) Prior Publication Data
US 2011/0223003 A1   Sep. 15, 2011

(51) Int. Cl.
*F04D 27/00* (2006.01)
(52) U.S. Cl.
USPC ............. 415/1; 415/112; 415/180; 415/174.1
(58) Field of Classification Search
USPC ........... 415/1, 17, 47, 49, 109, 110, 112, 114, 415/134, 138, 135, 170.1, 171.1, 174.1, 415/174.2, 180; 277/597, 930; 184/6.11
See application file for complete search history.

(56) References Cited

U.S. PATENT DOCUMENTS

| | | | | |
|---|---|---|---|---|
| 4,969,652 A | * | 11/1990 | Munson | 277/543 |
| 5,301,957 A | * | 4/1994 | Hwang et al. | 277/350 |
| 5,593,165 A | * | 1/1997 | Murray et al. | 277/543 |
| 5,813,830 A | * | 9/1998 | Smith et al. | 415/170.1 |
| 7,410,341 B2 | * | 8/2008 | Gockel et al. | 415/110 |

FOREIGN PATENT DOCUMENTS

| | | |
|---|---|---|
| FR | 2570763 A1 | 3/1986 |
| RU | 2191935 C2 | 10/2002 |

OTHER PUBLICATIONS

International Search Report and Written Opinion of PCT/RU2008/000730 mailed Aug. 13, 2009.

* cited by examiner

*Primary Examiner* — Edward Look
*Assistant Examiner* — William Grigos
(74) *Attorney, Agent, or Firm* — Norton Rose Fulbright Canada LLP

(57) ABSTRACT

An oil cooled runner, for a rotary seal between an engine case and a shaft rotationally mounted to the case, includes an annular runner ring having a platform with a radially outer seal engagement surface and a radially inner surface, and an oil distributor having a radially inner portion in communication with a source of liquid lubricant and an outer lubricant casting cone with a rim disposed radially inwardly from the inner surface of the platform.

14 Claims, 2 Drawing Sheets

OIL COOLED RUNNER

CROSS-REFERENCE TO RELATED APPLICATION

The present application is a national phase entry under 35 USC 371 of international patent application No. PCT/RU2008/000730 filed Nov. 28, 2008, the entire content of which is incorporated herein by reference.

TECHNICAL FIELD

The field relates generally to gas turbine engines and more particularly to an oil cooled runner that engages a seal to maintain a rotary seal and contain liquid lubricant within a bearing housing.

BACKGROUND

In order to seal liquid lubricant within a bearing housing through which a rotary shaft is mounted, a seal contact face that engages a runner on the shaft is often used. The runner-to-seal gap is maintained within a controlled range to minimize leakage while generating minimal frictional resistance to rotation.

Friction generates heat which is dissipated by bathing the runner in a flow of liquid lubricant. Cooled lubricant flows into the bearing housing from a heat exchanger and is distributed through various channels and ejected through jets toward sources of heat to cool and lubricate moving parts.

Since the runner is made of metal, the temperature of the runner during operation results in thermally induced expansion and contraction. Therefore to control the runner-to-seal gap, control and regulation of the temperature of the runner is required. The use of oil jets to spray cooled oil on the runner is a conventional manner to maintain runner temperature in a controlled range.

SUMMARY

There is provided an oil cooled runner, for a rotary seal between an engine case and a shaft rotationally mounted to the case, the runner comprising: an annular runner ring having a platform with a radially outer seal engagement surface and a radially inner surface; and an oil distributor having a radially inner portion in communication with a source of liquid lubricant and an outer lubricant casting cone with a rim disposed radially inwardly from the inner surface of the platform.

There is also provided a method of controlling a radial clearance gap between a runner and a carbon seal over an operating temperature range of a gas turbine engine, the method comprising the steps of: selecting a desired temperature of the runner relative to an engine temperature within said operating temperature range, the desired temperature of the runner causing the predetermined radial clearance gap in view of thermal growth differential between the runner and the carbon seal; and maintaining the desired temperature of the runner by directing a flow of liquid lubricant against a surface of the runner, whereby maintaining the desired temperature of the runner controls the radial clearance gap.

DESCRIPTION OF THE DRAWINGS

Reference is now made to the accompanying figures depicting aspects of the present invention, in which.

DETAILED DESCRIPTION

Figure 1:
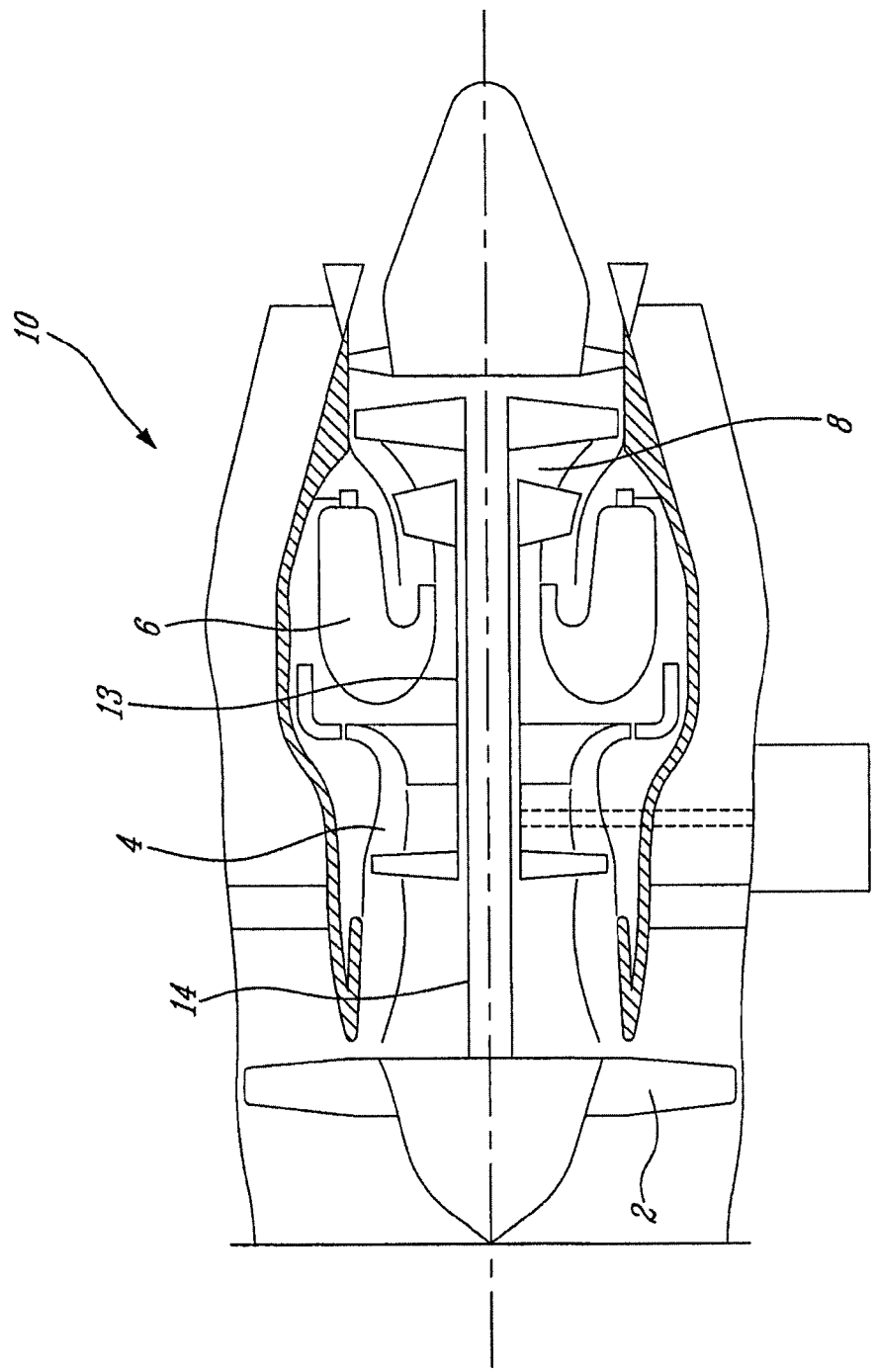
FIG. 1 shows a schematic cross-section of a gas turbine engine.

FIG. 1 illustrates a gas turbine engine 10 of a type preferably provided for use in subsonic flight, generally comprising in serial flow communication a fan 2 through which ambient air is propelled, a multistage compressor 4 for pressurizing the air, an annular reverse flow combustor 6 in which the compressed air is mixed with fuel and ignited for generating an annular stream of hot combustion gases, and a turbine section 8 for extracting energy from the combustion gases. The turbine section 8 may include a high pressure turbine 7 mounted on high pressure shaft 13 and a low pressure turbine 9 mounted on low pressure shaft 14. The low and high pressure shafts 13, 14 are concentric and respectively mounted for rotation within bearings.

FIG. 1 shows a turbo-fan gas turbine engine, however it will be understood however that the invention is equally applicable to any type of engine with a combustor and turbine section such as a turbo-shaft, a turbo-prop, or auxiliary power units.

An oil cooled runner for a rotary seal between a shaft, such as the high or low pressure shaft 13, 14 for example, rotationally mounted within a supporting structure, such as the engine case, is provided. Such rotary seals are provided in numerous locations in the gas turbine engine, such as to contain liquid lubricant within bearing chambers for example.

Figure 2:
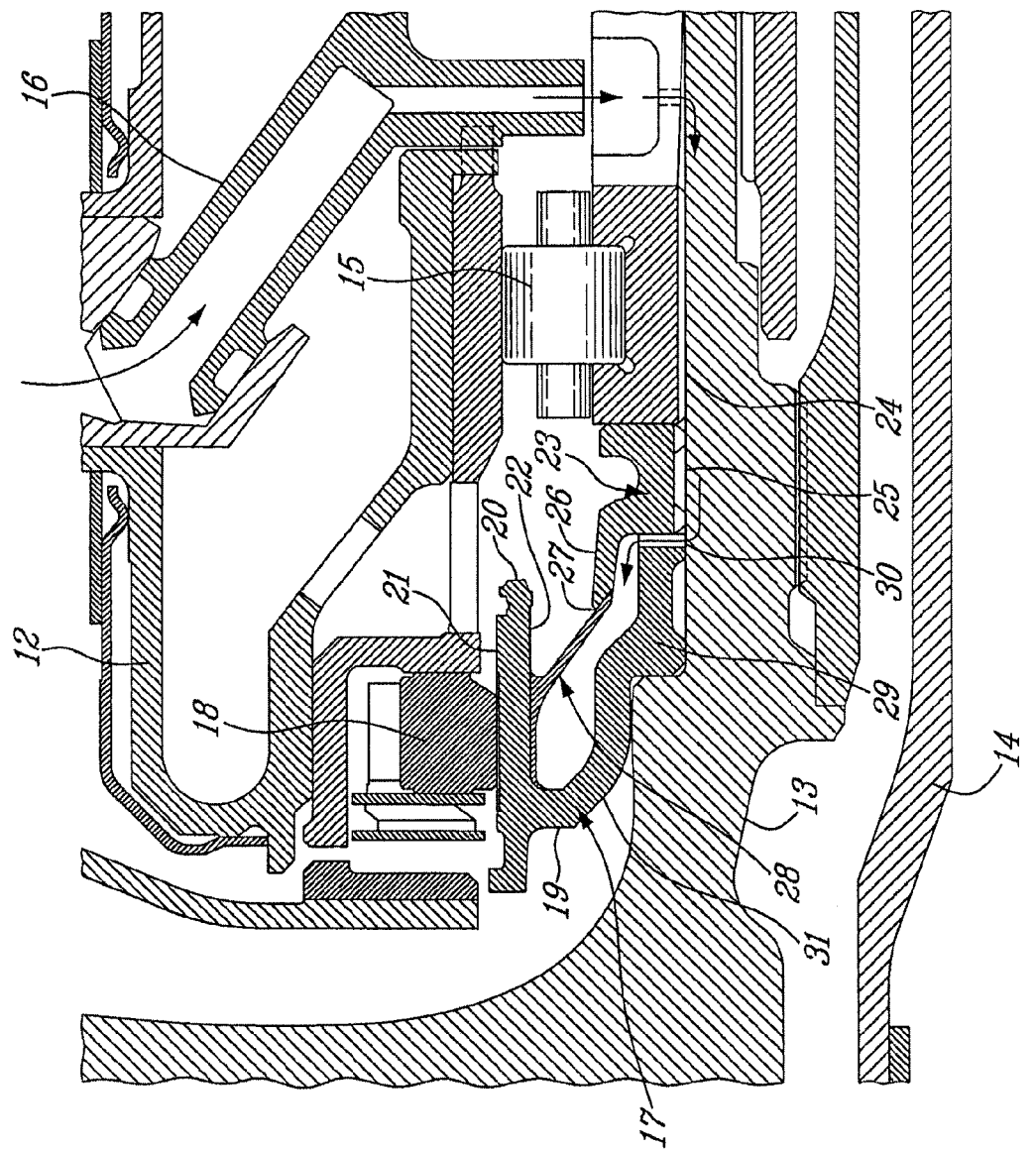
FIG. 2 is a cross-sectional detail view showing an upper half of a bearing enclosure, inner and outer shafts, with a carbon seal ring engaging the oil cooled runner.

Referring to FIG. 2, a bearing chamber 12 which supports the outside high pressure shaft 13 is shown as an example with the coaxial inside low pressure shaft 14 disposed therewithin. However, it will be understood by those skilled in the art that the present rotary seal and oil cooled runner can be used in any bearing chamber and for various other structures in a gas turbine engine where a rotary seal is required.

The bearing chamber 12 forms part of the engine case and serves to support and lubricate the bearings 15 on which the high pressure shaft 13 is rotationally mounted to the engine case. Liquid lubricant or oil is provided to the bearing chamber 12 through the oil supply conduit 16. The present invention relates to an oil cooled runner 17 which engages an annular carbon seal 18 to retain oil within the bearing chamber 12 during circulation of the oil for lubrication, rinsing worn particles and cooling purposes.

Due to the frictional contact between engaging surfaces of the stationary carbon seal 18 and the rotating oil cool runner 17, heat is generated through friction and heat must be dissipated in order to maintain the physical geometry of the runner 17. Heat will cause expansion and possible distortion of the runner 17. Control of the heat generated is necessary to avoid excessive movement and distortion. Optimal maintenance of a small gap between the carbon seal 18 and the runner 17 is necessary for proper operation and to avoid oil leakage.

Accordingly, the radial clearance gap between the runner 17 and the carbon seal 18 may be controlled (i.e. maintained at a desired level), and this over the operating temperature range of the gas turbine engine. This prevents the radial clearance gap from becoming undesirably large as a result of any possible thermal growth mismatch between the carbon ring and the runner as the engine heats up, which could cause a loss in sealing effectives and possibly leakage. By providing a uniform temperature of the runner relative to the carbon seal, the radial clearance gap is maintained at an optimal clearance level. This is accomplished by first selecting the desired temperature of the runner relative to an engine temperature within the operating temperature range of the engine, and then maintaining the desired temperature of the runner by directing the flow of liquid lubricant against a surface of the runner thereby maintaining the desired temperature of the runner and thus controlling the radial clearance gap between the runner and the carbon seal. The temperature of the runner can accordingly be changed, i.e. increased or decreased, during operation of the engine as required in order to control the desired temperature required to maintain the optimal radial clearance gap. This may be done, for example, by varying at least one of the quantity and impingement location of the lubrication fluid (ex: cooling oil) that is directed onto the underside (i.e. radially inner) surface of the runner. The temperature of the runner may also be maintained at its desired level by providing a substantially uniform layer of the liquid lubricant on the impingement surface of the runner, such as the radially inner surface thereof for example.

The oil cooled runner 17 has an annular runner rim 19 that includes a platform 20 having a radially outer seal engagement surface 21 and a radially inner surface 22. The oil cooled runner 17 includes an oil distributor 23 having a radially inner portion in communication with the source of liquid lubricant. In the embodiment shown in the drawings, the lubricant is provided under pressure through the oil supply conduit 16 and then conveyed through axial grooves in the underside of the bearing raceway 24. The oil proceeds under pressure between the bearing raceway 24 and the high pressure shaft 13.

The oil distributor 23 also includes axially extending oil passages in the form of axial grooves 25 through which oil can be provided to the oil distributor 23. The oil distributor 23 also includes an outer lubricant casting cone 26 which receives the oil through axial groove 25. Due to the high speed of rotation of the shaft 13 and the distributor 23, oil is conveyed under centrifugal force radially outwardly, i.e. upward as shown in FIG. 2. The cone 26 has an inside surface which receives the oil and a rim 27 disposed radially inwardly from the inner surface 22 of the platform 20.

The centrifugal casting of oil from the rim 27 produces a uniform layer of oil 28 that is cast towards the inside of the inner surface 22 of the platform 20. Since heat is generated by friction between the surfaces of the carbon seal 18 and the seal engagement surface 21, the casting of the conical oil layer 28 to the underside or inner surface 22 of the platform 20 provides a uniform flow of oil that absorbs heat through convection and contact with the platform 20. Conventional cooling systems include individual oil jets that impinge on runners at discrete points. Such oil jets require a relatively large area and the oil cooled runner of the invention can be provided in a limited space while producing a more uniform distribution of oil than conventional individual impinging oil jets.

The runner ring 19 as illustrated shows an inner hub 29 that is mounted on the shaft 13. The hub 29 radially abuts an inner portion of the oil distributor 23. Radially extending oil passages in the form for radial grooves 30 are provided in the abutting surface of the hub 29 or alternatively in the distributor 23. Accordingly, oil or liquid lubricant can be conveyed to the rim 29 by passing oil through the conduit 16, grooves in the bearing raceway 24 and axial grooves 25 joining with radially grooves 30. Oil is transported to the inside or underside surface of the cone 26 and transmitted to the casting rim 27 through centrifugal force.

In the embodiment shown the runner 17 includes an annular web 31 between the hub 29 and platform 20. The hub 29, web 31 and platform 20 define a concave annular recess into which the rim 27 of the cone 26 extends. As a result, the conical layer of oil 28 is captured within this recess. Cooling oil layer 28 can uniformly coat and reside on the inner surface 22 of the platform 20 having a residence time sufficient to absorb and convey away frictionally produced heat from the platform 20.

The above description is meant to be exemplary only, and one skilled in the art will recognize that changes may be made to the embodiments described without department from the scope of the invention disclosed. Still other modifications which fall within the scope of the present invention will be apparent to those skilled in the art, in light of a review of this disclosure, and such modifications are intended to fall within the appended claims.

The invention claimed is:

1. An oil cooled runner, for a rotary seal between an engine case and a shaft rotationally mounted to the case, the runner comprising:
   an annular runner ring having a platform with a radially outer seal engagement surface and a radially inner surface; and
   an oil distributor having a radially inner portion in communication with a source of liquid lubricant and an outer lubricant casting cone with a rim disposed radially inwardly from the inner surface of the platform.

2. The oil cooled runner of claim 1, wherein the inner portion of the oil distributor includes axially extending oil passages.

3. The oil cooled runner of claim 2, wherein the oil passages comprise axial grooves in an inner shaft engagement surface.

4. The oil cooled runner of claim 1, wherein the runner ring includes an inner hub abutting the inner portion of the oil distributor, and at least one of the hub and inner portion includes radially extending oil passages.

5. The oil cooled runner of claim 4, wherein the radially extending oil passages comprise radial grooves in an abutting surface of the hub.

6. The oil cooled runner of claim 4, wherein the runner ring includes an annular web between the hub and the platform.

7. The oil cooled runner of claim 6, wherein the hub, web and platform define a concave annular recess.

8. The oil cooled runner of claim 7, wherein the rim of the cone extends into the recess.

9. A method of controlling a radial clearance gap between a runner and a carbon seal over an operating temperature range of a gas turbine engine, the method comprising the steps of:
   selecting a desired temperature of the runner relative to an engine temperature within said operating temperature range, the desired temperature of the runner causing the predetermined radial clearance gap in view of thermal growth differential between the runner and the carbon seal; and
   maintaining the desired temperature of the runner by directing a flow of liquid lubricant against a surface of the runner, whereby maintaining the desired temperature of the runner controls the radial clearance gap.

10. The method of claim 9, wherein the step of maintaining includes varying at least one of a quantity and impingement location of the liquid lubricant directed against the runner.

11. The method of claim 9, wherein the step of maintaining includes at least one of increasing the flow of the liquid lubricant directed against the runner, to increase the radial clearance gap, and decreasing the flow of the liquid lubricant, to reduce the radial clearance gap.

12. The method of claim 9, wherein the step of directing includes directing the flow of liquid lubricant against a radially inner surface of the runner, the inner surface being opposite a radially outer seal engagement surface facing the carbon seal.

13. The method of claim 12, wherein the step of directing includes directing a conical layer of liquid lubricant against the radially inner surface of the runner.

14. The method of claim 9, wherein the step of maintaining includes providing a substantially uniform layer of said liquid lubricant on said surface of the runner.

* * * * *